United States Patent
Diamond et al.

(10) Patent No.: US 12,233,744 B2
(45) Date of Patent: Feb. 25, 2025

(54) CHARGING SYSTEM FOR A VEHICLE

(71) Applicant: FORD GLOBAL TECHNOLOGIES, LLC, Dearborn, MI (US)

(72) Inventors: Brendan F. Diamond, Grosse Pointe, MI (US); Lorne Forsythe, Wind Lake, WI (US); Keith Weston, Canton, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 18/164,101

(22) Filed: Feb. 3, 2023

(65) Prior Publication Data
US 2024/0262241 A1    Aug. 8, 2024

(51) Int. Cl.
| | |
|---|---|
| *B60L 58/10* | (2019.01) |
| *B60L 50/60* | (2019.01) |
| *B60L 53/16* | (2019.01) |
| *B60Q 9/00* | (2006.01) |
| *B60R 25/31* | (2013.01) |
| *B60R 25/40* | (2013.01) |
| *H02J 7/00* | (2006.01) |

(52) U.S. Cl.
CPC ............. *B60L 58/10* (2019.02); *B60L 50/60* (2019.02); *B60L 53/16* (2019.02); *B60Q 9/00* (2013.01); *B60R 25/31* (2013.01); *B60R 25/403* (2013.01); *H02J 7/0063* (2013.01); *H02J 7/0068* (2013.01)

(58) Field of Classification Search
CPC .......... B60L 58/10; B60L 50/60; B60L 53/16; B60L 53/65; B60Q 9/00; B60F 25/31; B60F 25/403; H02J 7/0063; H02J 7/0068
See application file for complete search history.

(56) References Cited

U.S. PATENT DOCUMENTS

| | | | |
|---|---|---|---|
| 10,399,445 | B2 | 9/2019 | Yellambalase et al. |
| 2014/0021915 | A1* | 1/2014 | Staley ............... H01R 13/635 439/153 |
| 2015/0116099 | A1* | 4/2015 | Straugheir ............ B60R 25/23 340/426.11 |
| 2018/0201145 | A1 | 7/2018 | Yellambalase et al. |
| 2019/0066416 | A1 | 2/2019 | Dhillon et al. |
| 2019/0378365 | A1 | 12/2019 | Jordan, III et al. |
| 2021/0237578 | A1 | 8/2021 | Ing |
| 2023/0158903 | A1* | 5/2023 | Vega ..................... B60L 53/16 439/160 |

FOREIGN PATENT DOCUMENTS

| | | |
|---|---|---|
| EP | 4067159 A1 | 10/2022 |
| JP | 2008018839 A | 1/2008 |
| JP | 2012100417 A * | 5/2012 |

* cited by examiner

*Primary Examiner* — Michael J Zanelli
(74) *Attorney, Agent, or Firm* — David B Kelley; Brooks Kushman P.C (57) ABSTRACT

A vehicle includes a battery, an electric machine, an electrical port, sensors, and a controller. The battery is configured to store electrical power. The electric machine is configured to receive electrical power from the battery to propel the vehicle. The electrical port is configured to receive an electrical connector of a charging station to initiate a charging operation of the battery. The sensors are configured to monitor an exterior of the vehicle. The controller is programmed to, in response to the sensors detecting an unidentified individual approaching the vehicle, eject the electrical connector from the electrical port or enable full operation of the vehicle.

19 Claims, 4 Drawing Sheets

CHARGING SYSTEM FOR A VEHICLE

TECHNICAL FIELD

The present disclosure relates to hybrid/electric vehicles and charging systems for hybrid/electric vehicles.

BACKGROUND

Hybrid/electric vehicles may be propelled by electric machines that draw power from batteries. In some configurations, the batteries may require charging during non-use.

SUMMARY

A vehicle includes a battery, an electric machine, an electrical port, sensors, and a controller. The battery is configured to store electrical power. The electric machine is configured to receive electrical power from the battery to propel the vehicle. The electrical port is configured to receive an electrical connector of a charging station to charge the battery. The sensors are configured to monitor an exterior of the vehicle. The controller is programmed to, in response to the electrical port receiving the electrical connector to initiate a charging operation for the battery, restrict power flow from the battery to the electric machine to limit operation of the vehicle. The controller is further programmed to, in response to disengaging the electrical connector from the electrical port, facilitate power flow from the battery to the electric machine such that operation of the vehicle is not limited. The controller is further programmed to, in response to the sensors detecting an unidentified individual approaching the vehicle, override restricting power flow from the battery to the electric machine while the electrical connector is received within the electrical port.

A vehicle includes a battery, an electric machine, an electrical port, and a controller. The battery is configured to store electrical power. The electric machine is configured to receive electrical power from the battery to propel the vehicle. The electrical port is configured to receive an electrical connector of a charging station to initiate a charging operation of the battery. The controller is programmed to, in response to a condition prompting the release of the electrical connector, automatically eject the electrical connector from the electrical port.

A vehicle includes an electrical port, a user interface, and a controller. The electrical port is configured to receive an electrical connector of a charging station to initiate a charging operation of a battery. The user interface is configured to receive inputs from an operator to control the vehicle and communicate one or more conditions to the operator. The controller is programmed to, in response to a condition prompting the release of the electrical connector during the charging operation, notify the operator via the user interface of the condition and prompt the operator to remotely eject the electrical connector from the electrical port via the user interface. The controller is further programmed to, in response to the operator engaging the user interface to eject the electrical connector from the electrical port after the prompt, eject the electrical connector from the electrical port.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
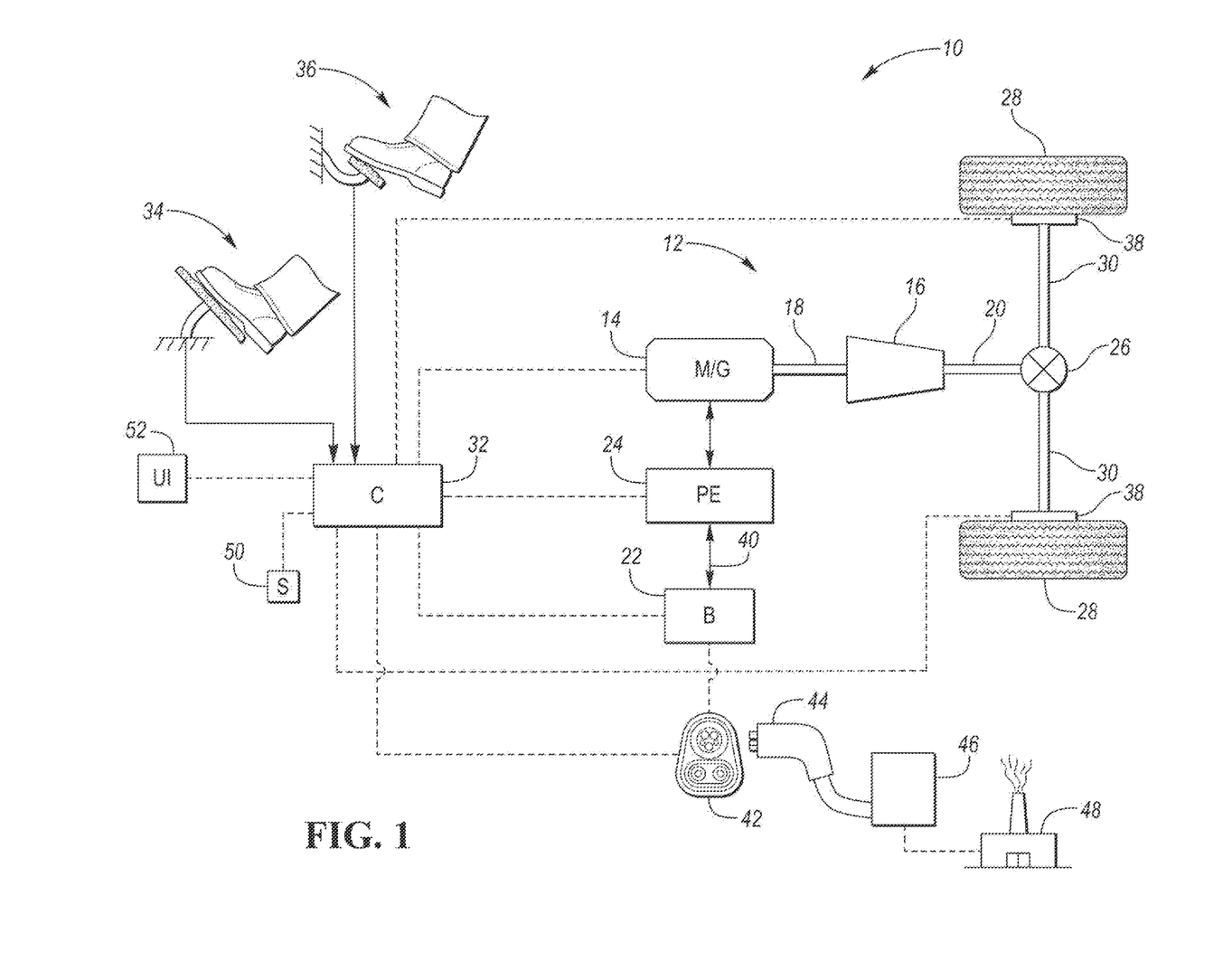
FIG. 1 is a schematic illustration of a representative powertrain of an electric vehicle and a charging station for the electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component amount or presence, intake air flow (MAF), etc.

The vehicle 10 may be configured to receive power from an external power source to charge the battery 22. For example, the vehicle 10 may include an electrical port 42 that is configured to receive and engage an electrical connector 44 of a charging station 46 to receive power from the charging station 46 to charge the battery 22. The electrical port 42 may also be referred to as a charging port. Connection between the electrical port 42 and electrical connector 44 may initiate a charging operation of the battery 22. The charging station 46 may be connected to a power grid that receives electrical power from a power plant 48 or may be connected to another power source (e.g., a bank of batteries, solar panels, etc.).

The vehicle 10 may include sensors 50 configured to monitor an exterior of the vehicle 10. The sensors 50 may be utilized for object detection, adaptive cruise control, or other functions. The sensors 50 may be any type of sensor configured to monitor the exterior of the vehicle 10 (e.g., radar, lidar, sonar, cameras, etc.).

A control panel or user interface 52 may be configured received inputs from a vehicle operator to control various aspects of the vehicle 10. The operator may input instructions to the user interface 52 via any known type of interface such as buttons, knobs, dials, levers, switches, touchscreens, keyboards, etc.). The user interface 52 may also be configured to communicate one or more optional settings, conditions, etc. to the operator. Such communications may be haptic (e.g., through vibrating motors), audible (e.g., sounds or words communicated over speakers within the vehicle), or visual (e.g., via illuminating lights on a control panel or displaying information on a display screen). The user interface 52 may be integrated into the vehicle 10 or may be part of a device that is remote from the vehicle 10 but communicates wirelessly with the vehicle 10 (e.g., a cellular phone or key fob).

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Figure 2:
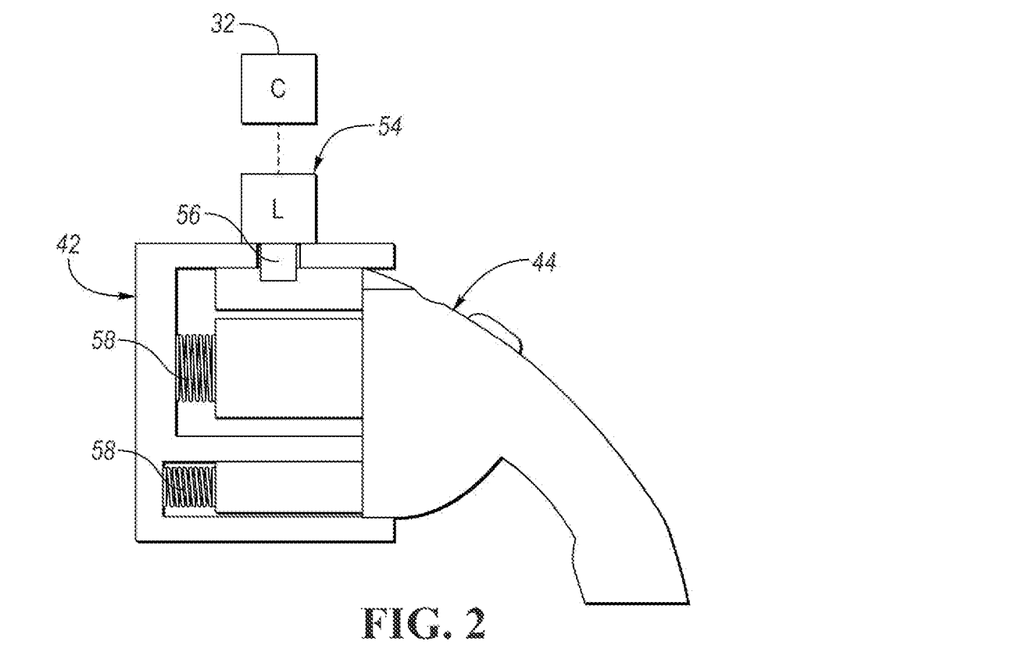
FIG. 2 is a diagrammatic view of an engagement between an electrical port on the vehicle and an electrical connector of a charging station.
Figure 3:
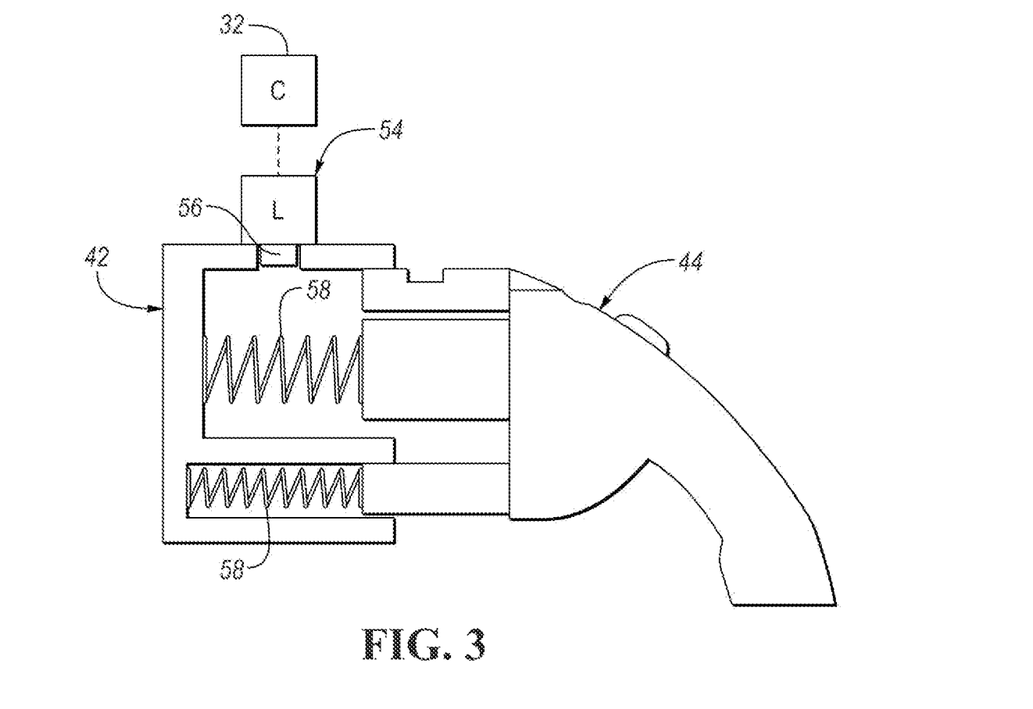
FIG. 3 is a first diagrammatic view of a disengagement between the electrical port on the vehicle and the electrical connector of the charging station.
Figure 4:
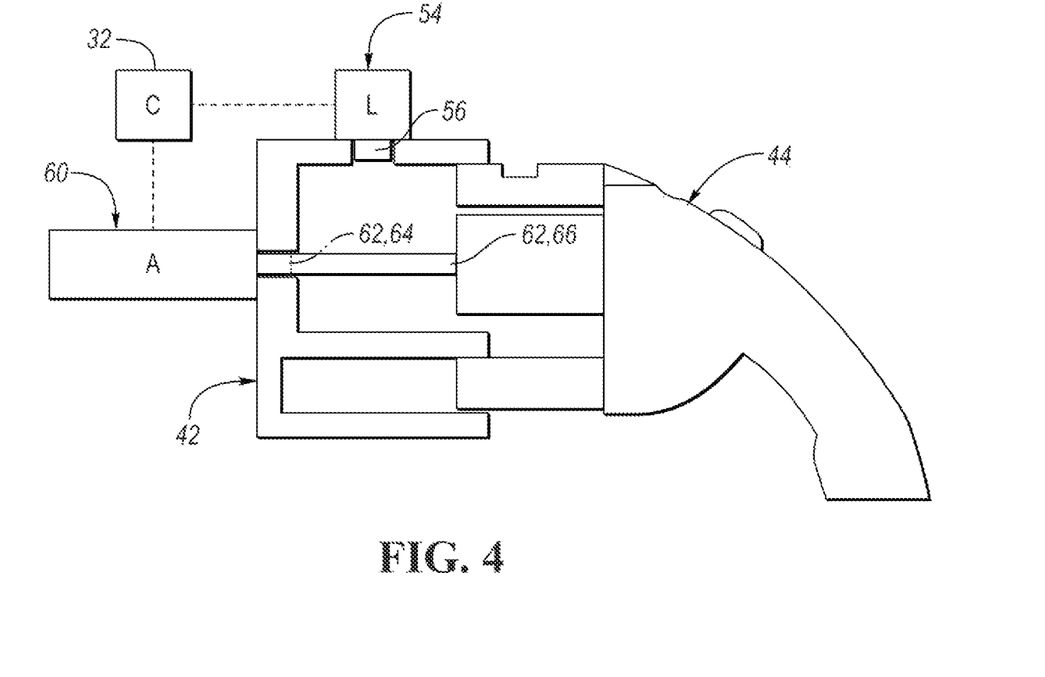
FIG. 4 is a second diagrammatic view of a second disengagement between the electrical port on the vehicle and the electrical connector of the charging station.

Referring to FIGS. 2-4, engagement and disengagement between the electrical port 42 on the vehicle 10 and the electrical connector 44 of the charging station 46 are illustrated. More specifically, FIG. 2 illustrates an engagement between the electrical port 42 and the electrical connector 44 while FIGS. 3 and 4 each illustrate a disengagement between the electrical port 42 and the electrical connector 44. The vehicle 10 may further include a lock 54 that is secured to the electrical port 42. The lock 54 is configured transition between a locked condition (e.g., FIG. 2) and an unlocked condition (e.g., FIGS. 3 and 4). The lock 54 is configured to secure the electrical connector 44 within the electrical port 42 and prevent removal of the electrical connector 44 from the electrical port 42 when in the locked condition. The lock 54 is also configured to facilitate (e.g., allow) removal of the electrical connector 44 from the electrical port 42 when in the unlocked condition.

The lock 54 may be in communication with and controlled by the controller 32. For example, the lock 54 may comprise an electrical solenoid that includes a push rod 56 that (i) advances and engages the electrical connector 44 (e.g., FIG. 2) to secure the electrical connector 44 to and within the electrical port 42 and (ii) retracts and disengages the electrical connector 44 (e.g., FIGS. 3 and 4) to facilitate removal of the electrical connector 44 from the electrical port 42. Such an electrical solenoid or any other device that is utilized as the lock 54 may receive electrical power from an internal power source of the vehicle 10 (e.g., battery 22).

Once the lock 54 is transitioned to the unlocked condition, removal of the electrical connector 44 from the electrical port 42 may be facilitated in one of several ways. For example, the electrical connector 44 may be removed from the electrical port 42 manually by the vehicle operator. Alternatively, the electrical connector 44 may be removed from the electrical port 42 by an automatic or automated process. For example, the vehicle 10 may further include one or more biasing elements 58, such as springs (e.g., FIGS. 2 and 3), that are configured to automatically eject the electrical connector 44 from the electrical port 42 in response to transitioning the lock 54 from the locked condition to the unlocked condition. Such biasing elements 58 may be secured to the electrical port 42 and may be compressed when the electrical connector 44 is received within the electrical port 42 (e.g., FIG. 2). Maintaining the lock 54 in the locked condition provides a counterforce that prevent the springs 58 from decompressing. Transitioning the lock 54 from the locked condition to the unlocked condition may result in the spring decompressing and forcing the electrical connector 44 out from the electrical port (e.g., FIG. 3).

As another example, an actuator 60 may be configured to engage the electrical connector 44 to eject the electrical connector 44 from the electrical port 42 when the actuator 60 is activated. Such an actuator 60 may be secured to the electrical port 42. The actuator 60 may also comprise an electrical solenoid that includes a push rod 62 that transitions from a retracted position 64 to an advanced position 66 to engage and eject the electrical connector 44 from the electrical port 42. Such an electrical solenoid or any other device that is utilized as the actuator 60 (i) may be in communication with and controlled by the controller 32 and (ii) may receive electrical power from an internal power source of the vehicle 10 (e.g., battery 22).

Figure 5:
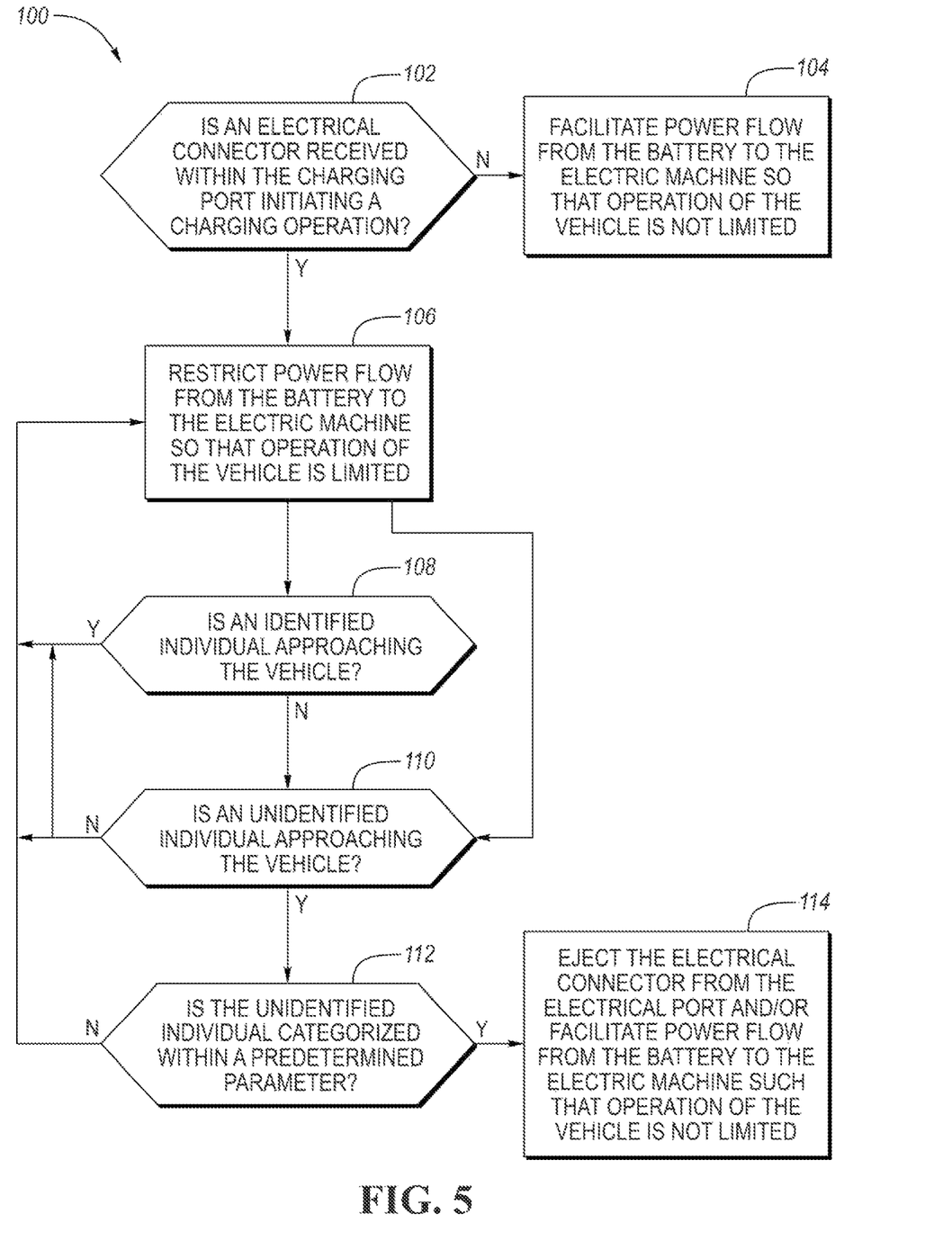
FIG. 5 is a flowchart illustrating a method for controlling the power flow and/or engagement between the vehicle and the charging station.

Referring to FIG. 5, a flowchart illustrating a method 100 for controlling the power flow and/or engagement between vehicle 10 and the charging station 46 is illustrated. The method 100 may be stored as control logic and/or an algorithm within the controller 32. The controller 32 may implement the method 100 by controlling the various components of the vehicle 10. The method 100 is initiated block 102 where is it determined if the electrical connector 44 has been received or is disposed within the electrical port 42 to initiate a charging operation for the battery 22. If the electrical connector 44 has not been received within the electrical port 42 or has been recently disengaged or disconnected from the electrical port 42, the method 100 moves on to block 104 where the controller 32 facilitates power flow from the battery 22 to the M/G 14 such that operation of the vehicle 10 is not limited (e.g., power may flow from the battery 22 to the M/G 14 to accelerate the vehicle 10 at a desired value based on the position of the accelerator pedal 34).

Returning to block 102, if the electrical connector 44 has been received or is disposed within the electrical port 42 to initiate a charging operation for the battery 22, the method 100 moves on to block 106, where the controller 32 restricts power flow from the battery 22 to the M/G 14 such that operation of the vehicle is limited (e.g., power flow from the battery 22 to the M/G 14 may be completely or partially restricted so that the vehicle 10 may not drive while the electrical connector 44 and the electrical port 42 are connected, regardless of the position of the accelerator pedal 34, in order to prevent the vehicle 10 from pulling away while the still connected to the charging station 46).

The method 100 next moves onto blocks 108 and 110 where it is determined if an identified individual is approaching the vehicle 10 or if an unidentified individual is approaching the vehicle 10, respectively. More specifically, the sensors 50 may monitor the immediate area surrounding the vehicle 10 to determine if identified individuals and/or unidentified individuals are approaching the vehicle 10. An unidentified individual may be distinguished from an identified individual via facial recognition or apparel recognition (e.g., facial and/or apparel characteristic data of identified individuals may be stored in the controller 32 and individuals approaching the vehicle 10 may be compared to the facial and/or apparel characteristic data to determine if such individuals are identified individuals or are unidentified individuals). An identified individual may correspond to someone who occupied the vehicle 10 prior to initiating the charging operation, was observed by the sensors 50 within the vehicle 10 or upon entering or exiting the vehicle 10, and whose characteristics (e.g., facial and/or apparel characteristics) were stored as data within the controller 32. Someone who is possessing an identified object, such as a weapon (e.g., gun, knife, bat, etc.), may be automatically characterized as an unidentified individual.

Alternative means of determining if a person approaching a vehicle is an "unidentified individual" might be, for example, someone without/absent a key fob or phone as a key (PaaK) tied to that particular vehicle. Additionally, if an "unidentified individual" makes an attempt to open an otherwise locked vehicle door and/or rear hatch. The user interface can also be used to preemptively ask the user (assume they're sitting in the vehicle while it charges) if they would like to increase the vehicles awareness/monitoring/response parameters (ex. prompt user of anyone approaching vehicle, vs. only notifying the user of those people approach at a velocity that exceeds a threshold, that have an identified object, or absent a FOB/Paak make an attempt at unlocking the vehicle doors or tailgate, at which point the increased vehicle awareness settings might automatically disconnect the charger and activate the vehicle for driving [vs. a lesser awareness setting where it is not 'automatically' discharged or activates the vehicle for driving]).

If (i) an identified individual is approaching the vehicle 10 at block 108 and no unidentified individual is approaching the vehicle 10 at block 110 or (ii) if no identified individual is approaching the vehicle 10 at block 108 and no unidentified individual is approaching the vehicle 10 at block 110, the method 100 returns to block 106 where the controller 32 maintains restricting power flow from the battery 22 to the M/G 14 such that operation of the vehicle 10 is limited. Also, at block 106 the engagement between the electrical connector 44 and the electrical port 42 may be maintained, which may include (i) the lock 54 remaining in the locked condition and/or (ii) the push rod 62 of the actuator 60 remaining in the retracted position 64 to so that the electrical connector 44 and the electrical port 42 remain engaged.

If an unidentified individual is approaching the vehicle 10 at block 110, the method 100 moves on to block 112 where it is determined if the unidentified individual is categorized within a predetermined parameter (e.g., if the unidentified individual is within a predetermined distance of the vehicle 10 or if the unidentified individual is approaching the vehicle at a velocity that exceeds a threshold). If the unidentified individual is not categorized within a predetermined parameter (e.g., if the unidentified individual is not within a predetermined distance of the vehicle 10 or if the unidentified individual is not approaching the vehicle at a velocity that exceeds a threshold), the method 100 returns to block 106 where the controller 32 maintains restricting power flow from the battery 22 to the M/G 14 such that operation of the vehicle 10 is limited and maintains the engagement between the electrical connector 44 and the electrical port 42.

If the unidentified individual is categorized within a predetermined parameter (e.g., if the unidentified individual is within a predetermined distance of the vehicle 10 or if the unidentified individual is approaching the vehicle at a velocity that exceeds a threshold), the method 100 moves on to block 114 where the electrical connector 44 is ejected from the electrical port 42 and/or the controller 32 overrides restricting power flow from the battery 22 to the M/G 14 while the electrical connector 44 is received within the electrical port 42 such that operation of the vehicle 10 is not limited (e.g., power may flow from the battery 22 to the M/G 14 to accelerate the vehicle 10 at a desired value based on the position of the accelerator pedal 34).

At block 114, the electrical connector 44 may be automatically ejected from the electrical port 42. Alternatively at block 114, the vehicle operator may be notified via the user interface 52 (e.g., via haptic feedback, sound, or visually as described above) of the unidentified individual is approaching the vehicle 10 and the user interface 52 may prompt the operator to remotely eject the electrical connector 44 from the electrical port 42 via the user interface 52. The operator may then be required to engage the user interface 52 in order to eject the electrical connector 44 from the electrical port 42. Ejecting the electrical connector 44 from the electrical port 42 may include first transitioning the lock 54 to the unlocked condition following by either (i) the one or more biasing elements 58 ejecting the electrical connector 44 from the electrical port 42 or (ii) activating the actuator 60 (e.g., transitioning the push rod 62 to the advanced position 66) to eject the electrical connector 44 from the electrical port 42. An adapter that is secured to the electrical connector 44 may protect the electrical connector 44 in the event the electrical connector 44 is ejected in remotely from the electrical port 42.

If an unidentified individual is approaching the vehicle 10 it may be advantageous to ensure that the that operation of the vehicle 10 is not limited, even if the vehicle 10 is currently undergoing a charging operation where the electrical connector 44 has been received or is disposed within the electrical port 42, so that the operator may drive away from the unidentified individual in the event that such an individual may be a threat. Therefore, the method 100 (i) disconnects electrical connector 44 from the electrical port 42 remotely (e.g., without the vehicle operator having to exit the vehicle 10) and/or (ii) overrides restricting power flow from the battery 22 to the M/G 14 even if electrical connector 44 has been received or is disposed within the electrical port 42 at block 114. The method 100 may also notify the operators/managers of the charging station 46 or the police that (i) the electrical connector 44 was automatically or remotely ejected or (ii) that the restriction of power flow from the battery 22 to the M/G 14 of the vehicle 10 was overridden while connected to the charging station 46.

Alternatively, blocks 108, 110, and 112 may be replaced by a single block that determines if (i) a condition prompting the release of the electrical connector or (ii) a condition prompting overriding restricting power flow from the battery 22 to the M/G 14 is present. If such a condition is present the method 100 moves on to block 114. If such a condition is not present, the method 100 returns to block 106. Such a condition in this alternative may include the aforementioned unidentified individual approaching the vehicle 10 or other situation that may prompt the operator to quickly leave the area of the charging station 46 (e.g., an approaching wildfire, another vehicle approaching at a high rate of speed, an emergency vehicle needing access to the area, an emergency broadcast message, floods, other naturally occurring issues such as floods, etc.).

It should be understood that the flowchart in FIG. 5 is for illustrative purposes only and that the method 100 should not be construed as limited to the flowchart in FIG. 5. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated.

While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a battery configured to store electrical energy;
   an electric machine configured to receive electrical power from the battery to propel the vehicle;
   an electrical port configured to receive an electrical connector of a charging station to charge the battery;
   sensors configured to monitor an exterior of the vehicle; and
   a controller programmed to,
      in response to the electrical port receiving the electrical connector to initiate a charging operation for the battery, restrict power flow from the battery to the electric machine to limit operation of the vehicle,
      in response to disengaging the electrical connector from the electrical port, facilitate power flow from the battery to the electric machine such that operation of the vehicle is not limited, and
      in response to the sensors detecting an unidentified individual approaching the vehicle, override restricting power flow from the battery to the electric machine while the electrical connector is received within the electrical port.

2. The vehicle of claim 1, wherein the controller is further programmed to, in response to the electrical port receiving the electrical connector and the sensors detecting an identified individual approaching the vehicle, maintain restricting power flow from the battery to the electric machine.

3. The vehicle of claim 2, wherein the unidentified individual is distinguished from the identified individual via facial recognition or apparel recognition.

4. The vehicle of claim 2, wherein the identified individual corresponds to an individual who occupied the vehicle prior to initiating the charging operation.

5. The vehicle of claim 2, wherein the unidentified individual corresponds to an individual possessing an identified object.

6. The vehicle of claim 1, wherein the controller is programmed to override restricting power flow from the battery to the electric machine while the electrical connector is received within the electrical port only if the unidentified individual approaching the vehicle is within a predetermined distance of the vehicle.

7. The vehicle of claim 1, wherein the controller is programmed to override restricting power flow from the battery to the electric machine while the electrical connector is received within the electrical port only if the unidentified individual is approaching the vehicle at a velocity that exceeds a threshold.

8. A vehicle comprising:
a battery configured to store electrical energy;
an electric machine configured to receive electrical power from the battery to propel the vehicle;
an electrical port configured to receive an electrical connector of a charging station to initiate a charging operation of the battery; and
a controller programmed to, in response to a condition prompting the release of the electrical connector, automatically eject the electrical connector from the electrical port, wherein the condition corresponds to an unidentified individual approaching the vehicle.

9. The vehicle of claim 8, wherein the controller is further programmed to, in response to the electrical port receiving the electrical connector and to an identified individual approaching the vehicle, maintain engagement between the electrical connector and the electrical port.

10. The vehicle of claim 9, wherein the unidentified individual is distinguished from the identified individual via facial recognition or apparel recognition.

11. The vehicle of claim 9, wherein the identified individual corresponds to an individual who occupied the vehicle prior to initiating the charging operation.

12. The vehicle of claim 8, wherein the controller is programmed to eject the electrical connector from the electrical port only if the unidentified individual approaching the vehicle is within a predetermined distance of the vehicle.

13. The vehicle of claim 8, wherein the controller is programmed to eject the electrical connector from the electrical port only if the unidentified individual is approaching the vehicle at a velocity that exceeds a threshold.

14. A vehicle comprising:
an electrical port configured to receive an electrical connector of a charging station to initiate a charging operation of a battery;
a user interface configured to (i) receive inputs from an operator to control the vehicle and (ii) communicate one or more conditions to the operator; and
a controller programmed to,
in response to a condition prompting the release of the electrical connector during the charging operation, notify the operator via the user interface of the condition and prompt the operator to remotely eject the electrical connector from the electrical port via the user interface, and
in response to the operator engaging the user interface to eject the electrical connector from the electrical port after the prompt, eject the electrical connector from the electrical port.

15. The vehicle of claim 14 further comprising a lock secured to the electrical port, wherein the lock is (i) configured transition between locked and unlocked conditions, (ii) secure the electrical connector within the electrical port when in the locked condition, and (iii) facilitate removal of the electrical connector from the electrical port when in the unlocked condition.

16. The vehicle of claim 15, wherein the controller is further programmed to, in response to the operator engaging the user interface to eject the electrical connector from the electrical port subsequent to the prompt, transition the lock from the locked condition to the unlocked condition.

17. The vehicle of claim 15 further comprising a biasing element configured to automatically eject the electrical connector from the electrical port in response to transitioning the lock from the locked condition to the unlocked condition.

18. The vehicle of claim 15 further comprising an actuator secured to the electrical port, wherein the actuator upon activation is configured to engage the electrical connector to eject the electrical connector from the electrical port.

19. The vehicle of claim 18, wherein the controller is further programmed to, in response to the operator engaging the user interface to eject the electrical connector from the electrical port and the lock transitioning from the locked condition to the unlocked condition, activate the actuator to eject the electrical connector from the electrical port.

* * * * *